US009041595B2

(12) United States Patent
Cameron et al.

(10) Patent No.: US 9,041,595 B2
(45) Date of Patent: May 26, 2015

(54) DETERMINING THE LOCATION OF A LOAD FOR A TOWER CRANE

(75) Inventors: John F. Cameron, Los Altos, CA (US); Kurt Maynard, Gainesville, GA (US)

(73) Assignee: Trimble Navigation Limited, Sunnyvale, CA (US)

( * ) Notice: Subject to any disclaimer, the term of this patent is extended or adjusted under 35 U.S.C. 154(b) by 725 days.

(21) Appl. No.: 13/330,214

(22) Filed: Dec. 19, 2011

(65) Prior Publication Data

US 2013/0154869 A1    Jun. 20, 2013

(51) Int. Cl.
| | |
|---|---|
| *G01S 13/00* | (2006.01) |
| *G01S 13/88* | (2006.01) |
| *G01S 5/02* | (2010.01) |
| *G01S 13/42* | (2006.01) |
| *G01S 13/06* | (2006.01) |
| *B66C 15/06* | (2006.01) |
| *B66C 13/46* | (2006.01) |
| *B66C 15/04* | (2006.01) |

(52) U.S. Cl.
CPC .............. *G01S 13/88* (2013.01); *G01S 5/0284* (2013.01); *G01S 13/42* (2013.01); *G01S 13/06* (2013.01); *B66C 15/065* (2013.01); *B66C 13/46* (2013.01); *B66C 15/045* (2013.01)

(58) Field of Classification Search
CPC ....... G01S 17/023; G01S 13/88; G01S 19/14; G01S 13/06; G01S 13/42; G01S 19/42; G01S 5/0284; G01S 5/16; B66C 13/46; B66C 13/04; B66C 13/063; B66C 13/40; B66C 15/045; B66C 15/065

USPC ................... 342/118, 146, 175; 340/679, 685
See application file for complete search history.

(56) References Cited

U.S. PATENT DOCUMENTS

| | | | | |
|---|---|---|---|---|
| 4,216,868 | A * | 8/1980 | Geppert ........................ | 212/278 |
| 5,343,739 | A * | 9/1994 | Curry .......................... | 212/280 |
| 5,404,661 | A * | 4/1995 | Sahm et al. ..................... | 37/348 |
| 5,481,248 | A * | 1/1996 | Kruh ............................ | 340/685 |
| 5,634,565 | A * | 6/1997 | Lesage ......................... | 212/276 |
| 6,028,432 | A * | 2/2000 | Doemens et al. ............. | 324/642 |
| 6,057,777 | A * | 5/2000 | Dunne et al. ................ | 340/686.1 |
| 6,229,473 | B1 * | 5/2001 | Doemens et al. .............. | 342/59 |
| 6,343,703 | B1 * | 2/2002 | Fleagle et al. ................ | 212/281 |
| 6,377,186 | B1 * | 4/2002 | Dunne et al. .................. | 340/679 |
| 6,380,849 | B1 * | 4/2002 | Eckstine et al. ............. | 340/436 |
| 6,473,715 | B1 * | 10/2002 | Eckstine ...................... | 702/151 |
| 6,496,765 | B1 * | 12/2002 | Robinett et al. ................ | 701/50 |
| 7,657,841 | B2 | 2/2010 | Shibamori et al. | |

(Continued)

FOREIGN PATENT DOCUMENTS

| | | |
|---|---|---|
| EP | 0921093 | 6/1999 |
| JP | 2001080881 | 3/2001 |

(Continued)

OTHER PUBLICATIONS

"International Search Report PCT/2012/064854", Mar. 29, 2013, 10 pages.

*Primary Examiner* — Peter Bythrow

(57) ABSTRACT

A tower crane load location determiner is disclosed. One example includes a load location measurer to provide load location measurement information for a load coupled with a tower crane. In addition, a load position determiner utilizes the load location measurement information to determine a location of the load. A user accessible load location provider provides the determined location of the load.

30 Claims, 7 Drawing Sheets

(56) References Cited

U.S. PATENT DOCUMENTS

| | | | |
|---|---|---|---|
| 7,750,762 B2 * | 7/2010 | Okano | 333/249 |
| 8,181,798 B2 | 5/2012 | Möller | |
| 8,352,128 B2 * | 1/2013 | Stocker et al. | 701/50 |
| 8,452,527 B2 | 5/2013 | Tan et al. | |
| 8,575,946 B2 * | 11/2013 | Kato et al. | 324/642 |
| 8,618,949 B2 * | 12/2013 | Maynard et al. | 340/685 |
| 8,627,575 B2 * | 1/2014 | Tang et al. | 33/333 |
| 8,738,175 B2 * | 5/2014 | Cameron et al. | 700/229 |
| 8,768,609 B2 * | 7/2014 | Maynard et al. | 701/301 |
| 2004/0140927 A1 * | 7/2004 | Meinecke et al. | 342/70 |
| 2005/0017867 A1 * | 1/2005 | Shaw et al. | 340/601 |
| 2005/0242052 A1 * | 11/2005 | O'Connor et al. | 212/344 |
| 2007/0168101 A1 * | 7/2007 | Shibamori et al. | 701/50 |
| 2007/0255494 A1 * | 11/2007 | Politick et al. | 701/213 |
| 2008/0134547 A1 * | 6/2008 | Kliffken et al. | 37/347 |
| 2009/0250424 A1 * | 10/2009 | Moller | 212/276 |
| 2010/0070179 A1 * | 3/2010 | Cameron | 701/301 |
| 2011/0025552 A1 * | 2/2011 | Sagala et al. | 342/109 |
| 2011/0076130 A1 * | 3/2011 | Stocker et al. | 414/815 |
| 2011/0187548 A1 * | 8/2011 | Maynard et al. | 340/685 |
| 2011/0191025 A1 * | 8/2011 | Maynard et al. | 701/301 |
| 2011/0199099 A1 * | 8/2011 | Kato et al. | 324/642 |
| 2012/0089320 A1 * | 4/2012 | Tan et al. | 701/300 |
| 2013/0032561 A1 * | 2/2013 | Singhose et al. | 212/273 |

FOREIGN PATENT DOCUMENTS

| | | | |
|---|---|---|---|
| JP | 2011102167 A | * | 5/2011 |
| WO | 2011060640 A1 | | 5/2011 |

* cited by examiner

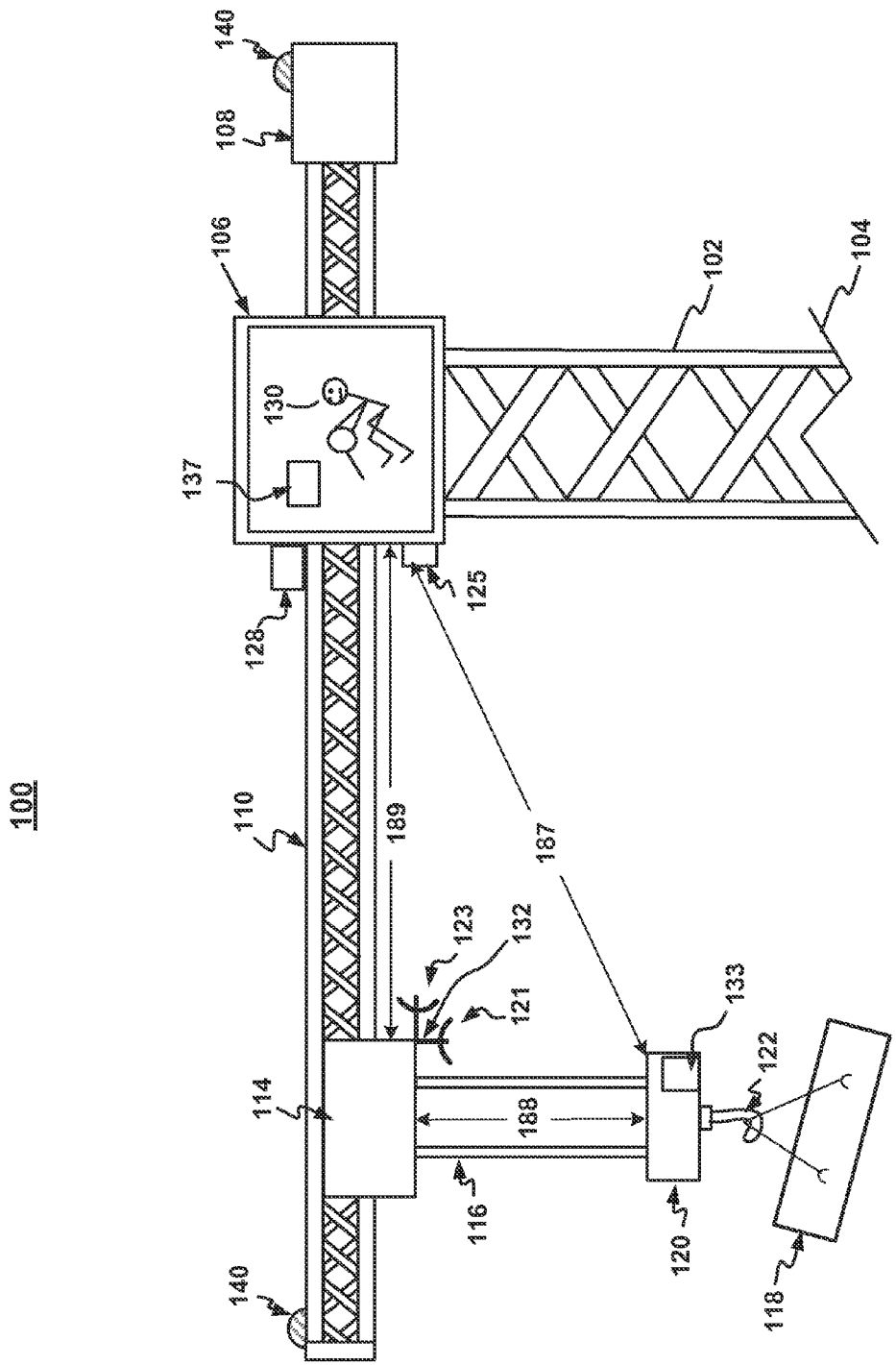

300

```
┌─────────────────────────────────────────────────┐
│ Utilizes a long range radar to perform load location │
│ measurements for a load coupled with a tower crane. │
│                      302                        │
└─────────────────────────────────────────────────┘
                         │
                         ▼
┌─────────────────────────────────────────────────┐
│ Utilizes the load location measurements to determine a │
│            location of the load.                │
│                      304                        │
└─────────────────────────────────────────────────┘
                         │
                         ▼
┌─────────────────────────────────────────────────┐
│ Providing the determined location of the load results │
│ on a user interface module in a user accessible format. │
│                      306                        │
└─────────────────────────────────────────────────┘
```

```
┌─────────────────────────────────────────────┐
│ Utilizes a laser distance measuring unit to │
│ perform load location measurements for a    │
│ load coupled with a tower crane.            │
│ 402                                         │
└─────────────────────────────────────────────┘
                      ↓
┌─────────────────────────────────────────────┐
│ Determining a location of the load based    │
│ on the load location measurements.          │
│ 404                                         │
└─────────────────────────────────────────────┘
                      ↓
┌─────────────────────────────────────────────┐
│ Providing a result of the location of the   │
│ load on a user interface module in a user   │
│ accessible format.                          │
│ 406                                         │
└─────────────────────────────────────────────┘
```

FIG. 4

DETERMINING THE LOCATION OF A LOAD FOR A TOWER CRANE

BACKGROUND

Tower cranes are used in many different applications. For example, on construction sites, tower cranes are used to move large and/or heavy objects from one location to another.

BRIEF DESCRIPTION OF THE DRAWINGS

The accompanying drawings, which are incorporated in and form a part of this application, illustrate and serve to explain the principles of embodiments in conjunction with the description. Unless noted, the drawings referred to this description should be understood as not being drawn to scale.

FIG. 1A is an illustration of a long range radar load location system for determining the location of a load according to one embodiment of the present technology.

FIG. 3 is a flowchart of a method for utilizing long range radar to determine the location of the load of a tower crane, according to one embodiment of the present technology.

FIG. 4 is a flowchart of a method for utilizing a laser for locating the load of a tower crane, according to one embodiment of the present technology.

DESCRIPTION OF EMBODIMENT(S)

Figure 1B:
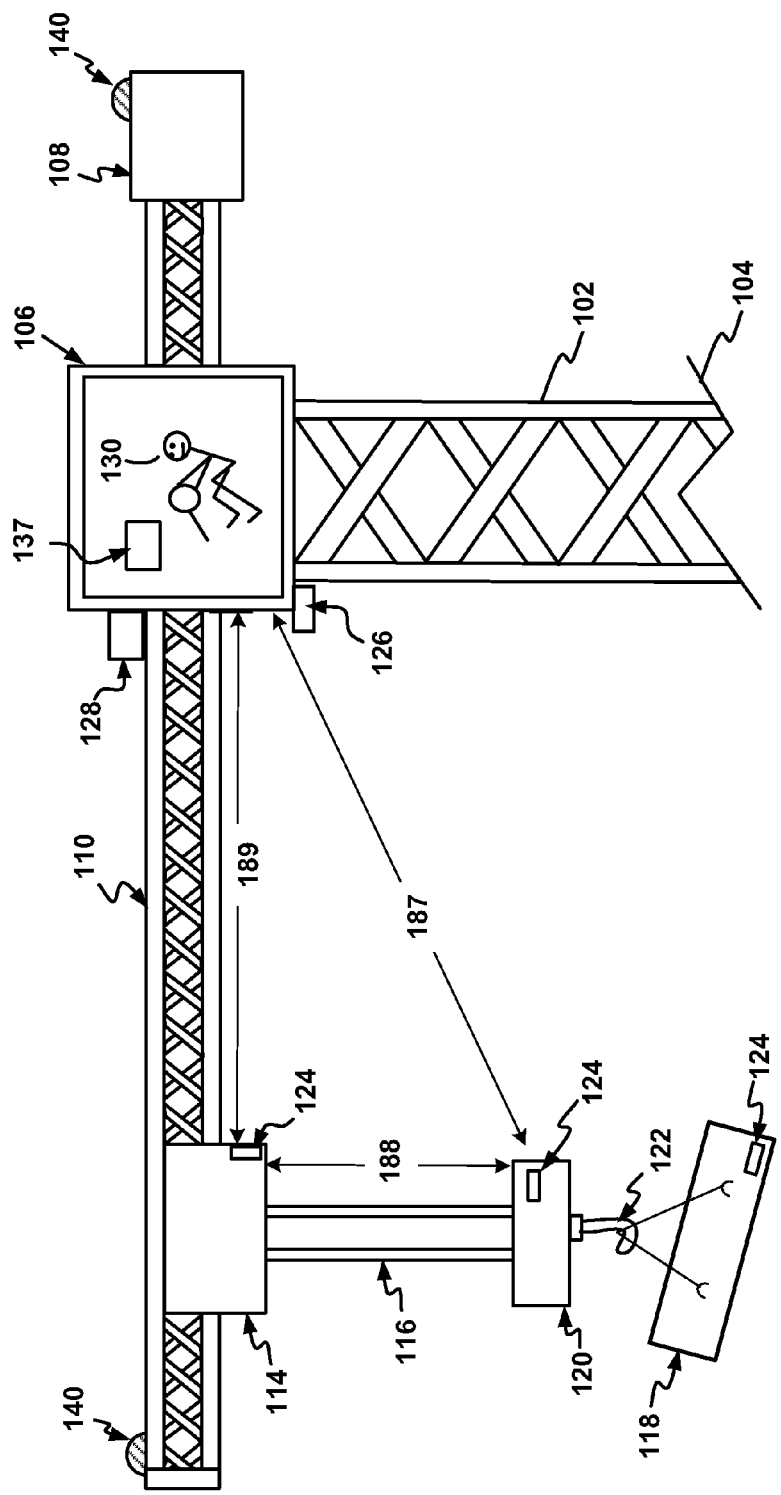
FIG. 1B is an illustration of a laser measuring system for determining the location of a load according to one embodiment of the present technology.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "receiving", "storing", "generating", "transmitting", "inferring," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

Overview

Embodiments of the present invention enable the determination of the location of a load of a tower crane. In the following discussion, the load location is the actual or physical location of the load. In one embodiment, the load location is defined with respect to the relational location of a portion of the tower crane, such as, but not limited to, the base, mast, cab and the like. In addition, the load location information is provided at a user interface in a user accessible format, such as, for example on a graphical user interface.

By providing load location information at a user interface, embodiments of the present technology enable safer and more efficient operation of a tower crane, which results in lower operating cost and improved safety. For example, the load location information can be displayed to the tower crane operator thereby allowing the operator to accurately and reliably monitor and control the load location. Moreover, the information can also be disseminated to other users including project managers, foremen and the like. In so doing, additional layers of operational insight and tower crane safety are achieved.

With reference now to FIG. 1A, an illustration of a tower crane 100 including a long range radar load location system for determining the location of a load is shown in accordance with an embodiment.

Tower crane 100 includes a base 104, a mast 102 and a jib (e.g., working arm) 110. The mast 102 may be fixed to the base 104 or may be rotatable about base 104. The base 104 may be bolted to a concrete pad that supports the crane or may be mounted to a moveable platform. In one embodiment, the operator 130 is located in a cab 106 which includes a user interface 137.

Tower crane 100 also includes a trolley 114 which is moveable back and forth on jib 110 between the cab 106 and the end of the jib 110. A cable 116 couples a hook 122 and hook block 120 to trolley 114. A counterweight 108 is on the opposite side of the jib 110 as the trolley 114 to balance the weight of the crane components and the object being lifted, referred to hereinafter as load 118.

In one embodiment shown in FIG. 1A, tower crane 100 also includes a downward pointing dish 121, a bent pipe 132, e.g., a coaxial, waveguide or the like, a cab facing dish 123 and a long range radar 125. In one embodiment long range radar 125 is battery powered and may include rechargeable characteristics including solar charging capabilities. In another embodiment, long range radar 125 is electrical wired with tower crane 100.

In FIG. 1A, long range radar 125 is shown on cab 106. However, in other embodiments long range radar 125 may be located at a different location and the downward pointing dish 121, bent pipe 132 and cap facing dish 123 would be adjusted accordingly. For example, long range radar 125 may be located on hook block 120.

In one embodiment, FIG. 1A also includes distances 187-189. In general, distances 187 represents the distance between cab 106 and hook block 120. Distance 188 represents the distance between hook block 120 and trolley 114. Distance 189 represents the distance between trolley 114 and cab 106. Although three distances are shown, it should be understood that in another embodiment a number of other distances may also be measured. Moreover, not all of the distances 187-189 may always be measured. However, the distances 187-189 are provided herein for purposes of clarity.

Tower crane 100 also includes a jib direction determiner 128. In general, jib direction determiner 128 determines the direction that jib 110 is facing. In various embodiments, jib direction determiner 128 may be a compass, a heading indicator, a satellite navigation position receiver offset from a known position, a satellite navigation position receiver utilizing two antenna located at different points along the jib, at least two satellite navigation position devices located at different points along the jib or a combination thereof.

FIG. 1A optionally includes one or more GNSS devices 140. In general, GNSS device 140 may be a complete GNSS receiver or just a GNSS antenna. In one embodiment, there are two GNSS devices 140. One is located at the front of the jib 110 and the other is located at counterweight 108. Although two GNSS devices 140 are shown, another embodiment may only utilizes one GNSS device 140. For example, one GNSS device 140 may provide a location while jib direction determiner 128 determines the direction that jib 110 is facing. In yet another embodiment jib direction determiner 128 may be a GNSS receiver utilizing two GNSS antenna located at different points along the jib such as those designated by GNSS devices 140. In addition, the locations of GNSS devices 140 may be in different areas, the illustration of the two GNSS devices 140 locations is provided merely for purposes of clarity.

FIG. 1A additionally shows an optional accelerometer 133 coupled with hook block 120. In general, optional accelerometer 133 is used to determine sway of the load 118. Although accelerometer 133 is shown as coupled with hook block 120, in another embodiment, the accelerometer 133 may be coupled with the load 118 or the hook 122.

Referring now to FIG. 1B, an illustration of a tower crane 100 including a laser measuring system for determining the location of a load is shown in accordance with an embodiment.

For purposes of clarity in the discussion, the description of some of the components of FIG. 1B that are similar to and previously described in FIG. 1A are not repeated herein.

In one embodiment, instead of utilizing a long range radar 125, FIG. 1B utilizes a laser measuring unit 126 to determine distances 187, 188 and 189.

For example, in FIG. 1B, laser measuring unit 126 is located at cab 106. Although laser measuring unit 126 is shown as being coupled with cab 106, in another embodiment, laser measuring unit 126 may be located at different locations on or around the tower crane 100. Moreover, a plurality of laser measuring units 126 may be utilized for redundancy or the like.

In one embodiment a reflective strip 124 is located at trolley 114 and an additional reflective strip is located at hook block 120. Although two locations are shown, the technology is well suited for locating reflective strips 124 at various other locations, such as, but not limited to, cab 106, load 118, mast 102, jib 110 and the like. In another embodiment no reflective strip 124 is needed for the operation of laser measuring unit 126. For example, the reflective strips 124 may be utilized to provide a level of accuracy with respect to the location upon which the beam from laser measuring unit 126 is being reflected. However, it should be appreciated that other means for determining the location at which the beam is being reflected may also be utilized.

In general, distances 187 represents the distance between cab 106 and hook block 120. Distance 188 represents the distance between hook block 120 and trolley 114. Distance 189 represents the distance between trolley 114 and cab 106. Although three distances are shown, it should be understood that in another embodiment a number of other distances may also be measured. Moreover, not all of the distances 187-189 may always be measured. However, the distances 187-189 are provided herein for purposes of clarity.

FIG. 1B also includes GNSS devices 140. In general, GNSS device 140 may be a complete GNSS receiver or just a GNSS antenna. In one embodiment, there are two GNSS devices 140. One is located at the front of the jib 110 and the other is located at counterweight 108. Although two GNSS devices 140 are shown, in another embodiment, FIG. 1B may only utilizes one GNSS device 140. For example, one GNSS device 140 may provide a location while jib direction determiner 128 determines the direction that jib 110 is facing. In yet another embodiment jib direction determiner 128 may be a GNSS receiver utilizing two GNSS antenna located at different points along the jib such as those designated by GNSS devices 140. In addition, the locations of GNSS devices 140 may be in different areas, the illustration of the two GNSS devices 140 locations in FIG. 1B is provided merely for purposes of clarity.

Figure 2:
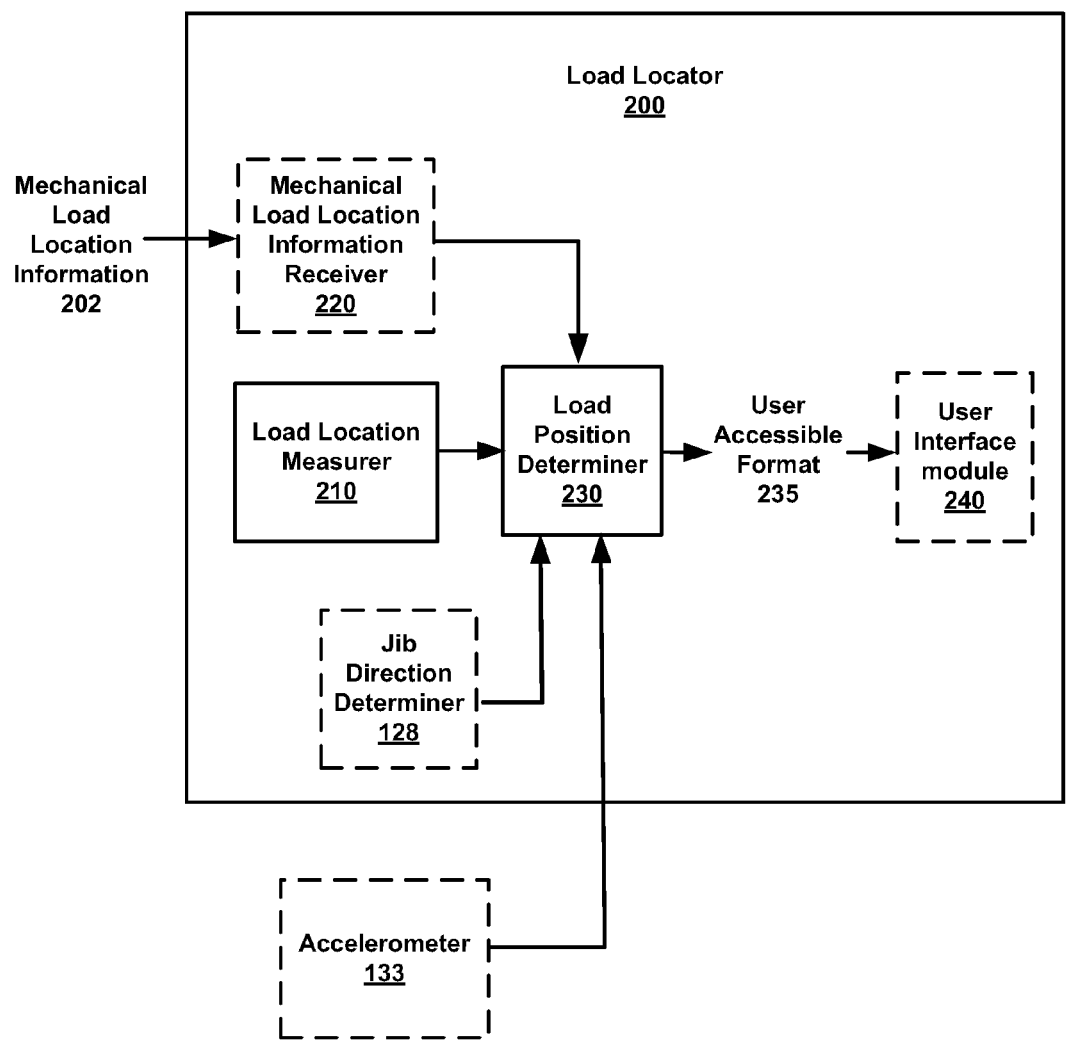
FIG. 2 is a block diagram of a tower crane load locator system, according to one embodiment of the present technology.

With reference now to FIG. 2, a tower crane load locator 200 is shown in accordance with an embodiment of the present technology. In one embodiment, load locator 200 includes a load location measurer 210, a load position determiner 230 and a user interface module 240. In one embodiment, load locator confirmer 200 may also include a mechanical load location information receiver 220 and a jib direction determiner 128. However, in another embodiment, load locator 200 may optionally receive jib direction determiner 128 information from an outside source. Similarly, load locator 200 may optionally receive accelerometer 133 information from an outside source.

In one embodiment, load location measurer 210 utilizes laser measuring unit 126, long range radar 125 or both to determine the location of load 118. Optional mechanical load location information receiver 220 may receive load location information provided by other load location tools such as those presently employed on a tower crane. In one embodiment, load position determiner 230 may provide offset information or other calibration capabilities to other mechanical load location information 202 providers.

Load position determiner 230 utilizes the information from load location measurer 210 to determine a location of the load. The load location information is then provided in a user accessible format to a user interface module 240. In one embodiment, user interface module 240 is distinct from load locator 200. In another embodiment, user interface module 240 is a graphical user interface that is included within the load locator 200 system.

Optional Jib direction determiner 128 determines the direction the jib is facing. Optional accelerometer 133 is used to determine sway of the load 118. Although accelerometer 133 is shown as coupled with hook block 120, in another embodiment, the accelerometer 133 may be coupled with the load 118 or the hook 122.

In one embodiment, in addition to utilizing distance measurements such as 187-189 determined by load location measurer 210, load position determiner 230 may also utilize the optional jib direction information or the accelerometer 133 information or both the jib direction information and the accelerometer 133 information to determine the location of the load 118.

With reference now to FIG. 3, a flowchart 300 of a method for utilizing long range radar to determine the location of the load of a tower crane is shown according to one embodiment of the present technology.

With reference now to 302 of FIG. 3 and FIG. 1A, one embodiment utilizes long range radar to perform load location measurements for a load coupled with a tower crane. For example, long range radar 125 performs distance measurements in conjunction with the downward pointing dish 121, bent pipe 132, and cab facing dish 123 to determine the distance measurements that provide the location information for the tower crane load 118. In one embodiment, long range radar 125 is 77 GHz long range radar or the like. However, although a 77 GHz long range radar is discussed herein, the technology may utilize other frequency ranges such as 9 GHz, 24 GHz, 80 GHz and the like.

In one embodiment, long range radar 125 utilizes the cab facing dish 123 with bent pipe 132 and downward pointing dish 121 to redirect the sensor beam from the approximately horizontal axis to the approximately vertical axis to allow the radar to determine the distance to trolley 114 as well as hook block 120. Thus, the distances 188-190 can be determined.

In general, once two sides of the triangular plane are known, the third side can be calculated. For example, assuming long range radar 125 was located at cab 106; leg 189: the distance between cab 106 and trolley 114 could be measured. Similarly leg 188: the distance between trolley 114 and hook block 120 could also be measured. Then, distance 187 could be solved for using a formula such as the Pythagorean Theorem.

In one embodiment a jib direction is also determined. For example, the jib direction may be determined by numerous devices including, but not limited to, a compass, a laser direction finder, one or more GNSS receivers, or the like. In another embodiment, the jib direction may be determined by other elements associated with GNSS including: Differential GPS, Real-time Kinematic (RTK), and Network RTK systems. Each of these systems is described in further detail in the description of FIG. 6.

With reference now to 304 of FIG. 3 and FIG. 1A, one embodiment utilizes the load location measurements to determine a location of the load. For example, in one embodiment the long range radar measurements will provide a location of the load as a given distance 189 and height 188 from the cab 106. In another embodiment, the long range radar measurements and the jib direction information is combined to generate a location of the load 118. For example, although the long range radar measurements will provide a location of the load as a given distance 189 and height 188 from the cab 106, the information may not be directional but may instead define a radius of an arc or a circle. By incorporating the jib direction, a specific location on the arc or circle would be defined.

With reference now to 306 of FIG. 3 and FIG. 1A, one embodiment provides the determined location of the load results on a user interface in a user accessible format. That is, the information may be presented on a user interface, such as a graphical user interface (GUI) or the like. In addition, the information may be presented as an overlay on a map such as a site map or the like.

For example, a site map is used to organize and monitor activities on a construction site. The site map may indicate the location (or range of locations) where contact between the tower crane and another object is possible. It is important for the tower crane to not enter a restricted space where an accident could occur. Thus, in addition to providing information to be presented on the user interface, one embodiment may also provide warning information. In another embodiment, an automated stop or override may also be utilized.

For example, the load location information can be used to alert operators when they are not moving safely in terms of location, speed, acceleration, shock, load, jerk, etc. The information can also be used to automatically keep the tower crane within a predefined motion or path.

FIG. 4 is a flowchart of a method for utilizing a laser for locating the load of a tower crane, according to one embodiment of the present technology.

With reference now to 402 of FIG. 4 and FIG. 1B, one embodiment utilizes a laser distance measuring unit to perform load location measurements for a load coupled with a tower crane. For example, one embodiment performs load location measurements from laser measuring unit 126 to a plurality of reflective strips 124 coupled with different components of the tower crane. For example, in FIG. 1B, laser measuring unit 126 is located at cab 106 while reflective strips 124 are located at the trolley 114 and hook block 120. Although various locations are shown, the technology is well suited for locating laser measuring unit 126 and reflective strips 124 at various other locations, such as, but not limited to, hook block 120, load 118, mast 102, jib 110 and the like.

In one embodiment a jib direction is also determined. For example, the jib direction may be determined by numerous devices including one or more GNSS devices 140 coupled with the tower crane are utilized to determine the jib direction.

In general, GNSS device 140 may be a complete GNSS receiver or just a GNSS antenna. In one embodiment, there are two GNSS devices 140. One is located at the front of the jib 110 and the other is located at counterweight 108. Although two GNSS devices 140 are shown, in another embodiment, only one GNSS device 140 may be utilized. For example, one GNSS device 140 may provide a location while jib direction determiner 128 determines the direction that jib 110 is facing. In yet another embodiment jib direction may be determined by a GNSS receiver utilizing two GNSS antenna located at different points along the jib such as those designated by GNSS devices 140 at FIG. 1C. In another embodiment, the locations of GNSS devices 140 may be in different locations on the tower crane.

In another embodiment, an accelerometer 133 is coupled with a hook block of the tower crane, the accelerometer 133 provides sway information with respect to the hook block 120. Although accelerometer 133 is stated as being coupled with hook block 120, in another embodiment, the accelerometer 133 may be coupled with the load 118 or the hook 122.

With reference now to 404 of FIG. 4 and FIG. 1B, one embodiment utilizes the load location measurements to determine a location of the load. For example, in one embodiment the laser distance measurements will provide a location of the load as a given distance 189 and height 188 from the cab 106. In another embodiment, the laser measurements, the jib direction information and the accelerometer information is combined to generate a location of the load 118.

For example, the accelerometer information can be added to further refine the third side calculation that locates the load. For example, assuming laser measuring unit 126 was located at cab 106, legs 187 and 189 could be measured. By including the accelerometer 133 information, solving for the length of leg 188 is now performed by a more accurate method such as the Law of Cosines, where the accelerometer information is used to determine the cosine for the angle.

Moreover, in one embodiment, the additional jib direction information, the accelerometer information, or both can also be added to the trilateration information to generate additional useful information regarding load location, motion, rotation, and the like.

With reference now to 404 of FIG. 4 and FIG. 1B, one embodiment provides a result of the location of the load on a user interface in a user accessible format. That is, the information may be presented on a user interface, such as a graphical user interface (GUI) or the like. For example, the information may be a presented as plan and/or elevation views of the tower crane with the location of the load illustrated spatially with relation to an illustration of the tower crane. In addition, the information may be presented as an overlay on a map such as a site map or the like.

For example, the site map may indicate the location (or range of locations) where contact between the tower crane and another object is possible. Thus, in addition to providing information to be presented on the user interface, one embodiment may also provide warning information. In another embodiment, an automated stop or override may also be utilized.

For example, the load location information can be used to alert operators when they are not moving safely in terms of location, speed, acceleration, shock, load, jerk, etc. The information can also be used in automatic collision avoidance.

Collision Avoidance

For example, the load 118 location can be compared to the location of other devices and/or other objects. Moreover, if a safety zone is breached, e.g., an area a prescribed distance from the other device or object, a warning can be generated about the potential collision. In one embodiment, a safety threshold distance is used to help prevent collisions.

In another embodiment, the load location can be compared to pre-defined "do not enter" spaces. In this embodiment, pre-planning establishes areas or zones that should not be entered by particular devices. When it is determined that a load 118 has entered, or is about to enter, a "do not enter" zone, a warning can be generated and provided to the operator. The warning can help prevent collisions between the tower crane and other objects.

In yet another embodiment, in addition to providing a warning, the operation of the tower crane may be automatically stopped or otherwise manipulated to stop a collision or boundary incursion from actually occurring. For example, the system may include a first warning distance from an object or area having a first radius and also a second automatic override distance from an object or area at a smaller radius.

As such, if a load was approaching another object, as the warning distance is breached, the system would provide a user warning. However, if the load breached the automatic override distance, the operation of the tower crane may be automatically stopped, reversed, or the like. In so doing, significant safety and property damage may be automatically avoided.

It is appreciated that the autonomous position of the tower crane can be used to generate a real-time graphical representation of a work site. In one embodiment, the autonomous position of the tower crane is reported to a remote location where the activity can be monitored.

Computer System

Figure 5:
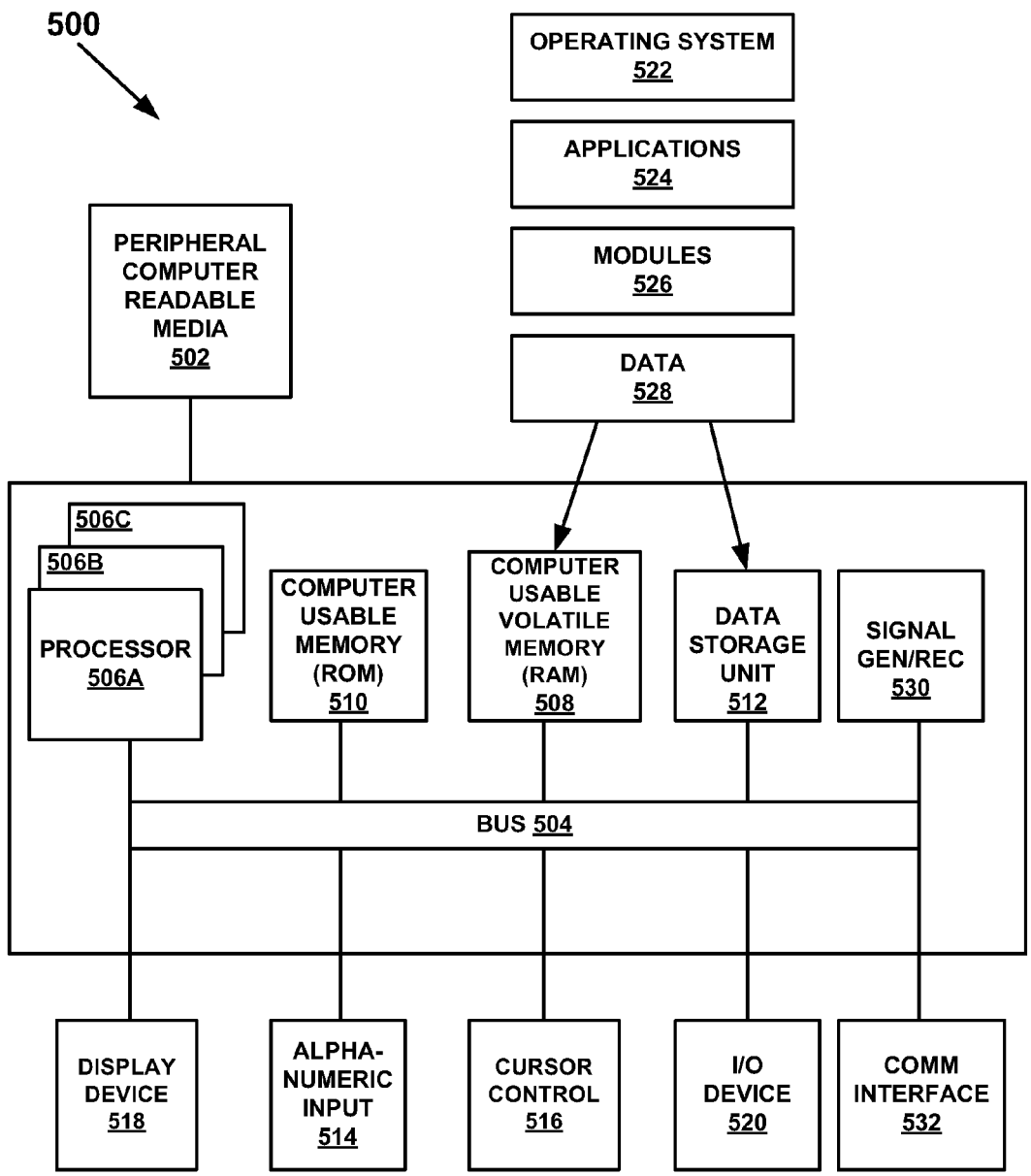
FIG. 5 is a block diagram of an example computer system upon which embodiments of the present technology may be implemented.

With reference now to FIG. 5, portions of the technology for providing a communication composed of computer-readable and computer-executable instructions that reside, for example, in non-transitory computer-usable storage media of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components of FIG. 1 or FIG. 3 may be combined with some or all of the components of FIG. 5 to practice the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a floppy disk, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 of the present embodiment also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described system 500. For example, a method of modifying user interface 225A of device 115A may be applied to operating system 522, applications 524, modules 526, and/or data 528.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, antenna, or other input/output interface. Communication interface 532 may physically, electrically, optically, or wirelessly (e.g. via radio frequency) couple system 500 with another device, such as a cellular telephone, radio, or computer system.

The computing system 500 is only one example of a suitable computing environment and is not intended to suggest any limitation as to the scope of use or functionality of the present technology. Neither should the computing environment 500 be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

GNSS Receiver

Figure 6:
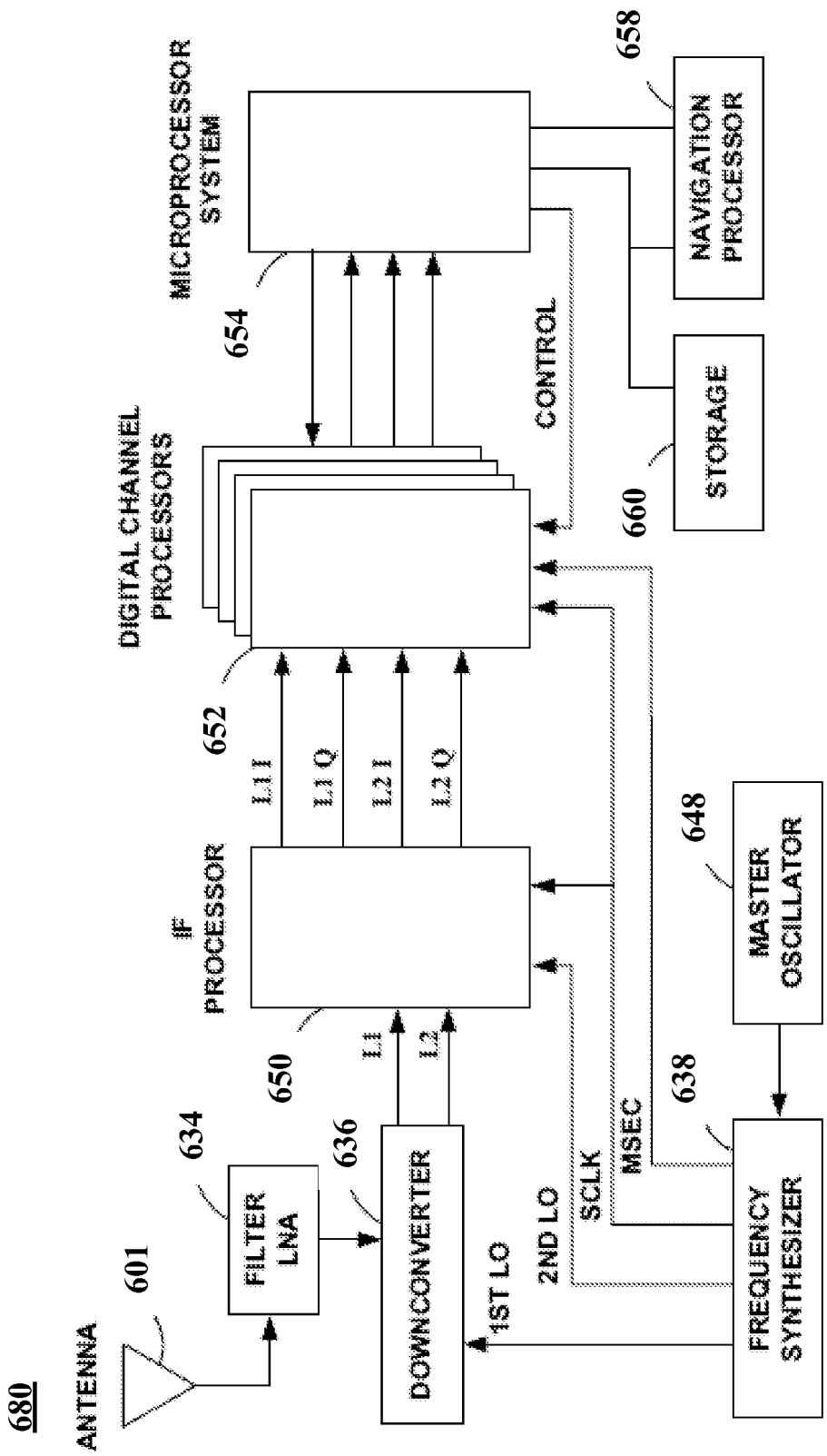
FIG. 6 is a block diagram of an example global navigation satellite system (GNSS) receiver which may be used in accordance with one embodiment of the present technology.

With reference now to FIG. 6, a block diagram is shown of an embodiment of an example GNSS receiver which may be used in accordance with various embodiments described herein. In particular, FIG. 6 illustrates a block diagram of a GNSS receiver in the form of a general purpose GPS receiver 680 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Further, although L1 and L2 signals are described, they should not be construed as a limitation to the signal type; instead, the use of the L1 and L2 signal(s) is provided merely for clarity in the present discussion.

Although an embodiment of a GNSS receiver and operation with respect to GPS is described herein, the technology is well suited for use with numerous other GNSS signal(s) including, but not limited to, GPS signal(s), Glonass signal(s), Galileo signal(s), and Compass signal(s).

The technology is also well suited for use with regional navigation satellite system signal(s) including, but not limited to, Omnistar signal(s), StarFire signal(s), Centerpoint signal(s), Beidou signal(s), Doppler orbitography and radio-positioning integrated by satellite (DORIS) signal(s), Indian regional navigational satellite system (IRNSS) signal(s), quasi-zenith satellite system (QZSS) signal(s), and the like.

Moreover, the technology may utilize various satellite based augmentation system (SBAS) signal(s) such as, but not limited to, wide area augmentation system (WAAS) signal(s), European geostationary navigation overlay service (EGNOS) signal(s), multi-functional satellite augmentation system (MSAS) signal(s), GPS aided geo augmented navigation (GAGAN) signal(s), and the like.

In addition, the technology may further utilize ground based augmentation systems (GBAS) signal(s) such as, but not limited to, local area augmentation system (LAAS) signal(s), ground-based regional augmentation system (GRAS) signals, Differential GPS (DGPS) signal(s), continuously operating reference stations (CORS) signal(s), and the like.

Although the example herein utilizes GPS, the present technology may utilize any of the plurality of different navigation system signal(s). Moreover, the present technology may utilize two or more different types of navigation system signal(s) to generate location information. Thus, although a GPS operational example is provided herein it is merely for purposes of clarity.

In one embodiment, the present technology may be utilized by GNSS receivers which access the L1 signals alone, or in combination with the L2 signal(s). A more detailed discussion of the function of a receiver such as GPS receiver 680 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 680 of FIG. 6.

In FIG. 6, received L1 and L2 signal is generated by at least one GPS satellite. Each GPS satellite generates different signal L1 and L2 signals and they are processed by different digital channel processors 652 which operate in the same way as one another. FIG. 6 shows GPS signals (L1=1575.42 MHz, L2=1227.60 MHz) entering GPS receiver 680 through a dual frequency antenna 601. Antenna 601 may be a magnetically mountable model commercially available from Trimble® Navigation of Sunnyvale, Calif., 94085. Master oscillator 648 provides the reference oscillator which drives all other clocks in the system. Frequency synthesizer 638 takes the output of master oscillator 648 and generates important clock and local oscillator frequencies used throughout the system. For example, in one embodiment frequency synthesizer 638 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 634 performs filtering and low noise amplification of both L1 and L2 signals. The noise figure of GPS receiver 680 is dictated by the performance of the filter/LNA combination. The downconverter 636 mixes both L1 and L2 signals in frequency down to approximately 175 MHz and outputs the analogue L1 and L2 signals into an IF (intermediate frequency) processor 30. IF processor 650 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 652 inputs the digitally sampled L1 and L2 inphase and quadrature signals. All digital channel processors 652 are typically identical by design and typically operate on identical input samples. Each digital channel processor 652 is designed to digitally track the L1 and L2 signals produced by one satellite by tracking code and carrier signals and to form code and carrier phase measurements in conjunction with the microprocessor system 654. One digital channel processor 652 is capable of tracking one satellite in both L1 and L2 channels.

Microprocessor system 654 is a general purpose computing device which facilitates tracking and measurements processes, providing pseudorange and carrier phase measurements for a navigation processor 658. In one embodiment, microprocessor system 654 provides signals to control the operation of one or more digital channel processors 652. Navigation processor 658 performs the higher level function of combining measurements in such a way as to produce position, velocity and time information for the differential and surveying functions. Storage 660 is coupled with navigation processor 658 and microprocessor system 654. It is appreciated that storage 660 may comprise a volatile or non-volatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Differential GPS

Embodiments of the present invention can use Differential GPS to determine position information with respect to a jib of the tower crane. Differential GPS (DGPS) utilizes a reference station which is located at a surveyed position to gather data and deduce corrections for the various error contributions which reduce the precision of determining a position fix. For example, as the GNSS signals pass through the ionosphere and troposphere, propagation delays may occur. Other factors which may reduce the precision of determining a position fix may include satellite clock errors, GNSS receiver clock errors, and satellite position errors (ephemerides).

The reference station receives essentially the same GNSS signals as rovers which may also be operating in the area. However, instead of using the timing signals from the GNSS satellites to calculate its position, it uses its known position to calculate timing. In other words, the reference station determines what the timing signals from the GNSS satellites should be in order to calculate the position at which the reference station is known to be. The difference between the received GNSS signals and what they optimally should be is used as an error correction factor for other GNSS receivers in the area. Typically, the reference station broadcasts the error correction to, for example, a rover which uses this data to determine its position more precisely. Alternatively, the error corrections may be stored for later retrieval and correction via post-processing techniques.

Real Time Kinematic System

An improvement to DGPS methods is referred to as Real-time Kinematic (RTK). As in the DGPS method, the RTK method, utilizes a reference station located at determined or surveyed point. The reference station collects data from the same set of satellites in view by the rovers in the area. Measurements of GNSS signal errors taken at the reference station (e.g., dual-frequency code and carrier phase signal errors) and broadcast to one or more rovers working in the area. The rover(s) combine the reference station data with locally collected position measurements to estimate local carrier-phase ambiguities, thus allowing a more precise determination of the rover's position. The RTK method is different from DGPS methods in that the vector from a reference station to a rover is determined (e.g., using the double differences method). In DGPS methods, reference stations are used to calculate the changes needed in each pseudorange for a given satellite in view of the reference station, and the rover, to correct for the various error contributions. Thus, DGPS systems broadcast pseudorange correction numbers second-by-second for each satellite in view, or store the data for later retrieval as described above.

RTK allows surveyors to determine a true surveyed data point in real time, while taking the data. However, the range of useful corrections with a single reference station is typically limited to about 70 km because the variables in propagation delay (increase in apparent path length from satellite to rover receiver, or pseudo range) changes significantly for separation distances beyond 70 km. This is because the ionosphere is typically not homogeneous in its density of electrons, and because the electron density may change based on, for example, the sun's position and therefore time of day. Thus for surveying or other positioning systems which must work over larger regions, the surveyor must either place additional base stations in the regions of interest, or move his base stations from place to place. This range limitation has led to the development of more complex enhancements that have superseded the normal RTK operations described above, and in some cases eliminated the need for a base station GNSS receiver altogether. This enhancement is referred to as the "Network RTK" or "Virtual Reference Station" (VRS) system and method.

Network RTK

Network RTK typically uses three or more GNSS reference stations to collect GNSS data and extract information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network. The control center computer processor then applies a process which interpolates the atmospheric and/or satellite ephemeris errors at any given point within the network coverage area and generates a pseudo range correction comprising the actual pseudo ranges that can be used to create a virtual reference station. The control center then performs a series of calculations and creates a set of correction models that provide the rover with the means to estimate the ionospheric path delay from each satellite in view from the rover, and to take account other error contributions for those same satellites at the current instant in time for the rover's location.

The rover is configured to couple a data-capable cellular telephone to its internal signal processing system. The surveyor operating the rover determines that he needs to activate the VRS process and initiates a call to the control center to make a connection with the processing computer. The rover sends its approximate position, based on raw GNSS data from the satellites in view without any corrections, to the control center. Typically, this approximate position is accurate to approximately 4-7 meters. The surveyor then requests a set of "modeled observables" for the specific location of the rover. The control center performs a series of calculations and creates a set of correction models that provide the rover with the means to estimate the ionospheric path delay from each satellite in view from the rover, and to take into account other error contributions for those same satellites at the current instant in time for the rover's location. In other words, the corrections for a specific rover at a specific location are determined on command by the central processor at the control center and a corrected data stream is sent from the control center to the rover. Alternatively, the control center may instead send atmospheric and ephemeris corrections to the rover which then uses that information to determine its position more precisely.

These corrections are now sufficiently precise that the high performance position accuracy standard of 2-3 cm may be determined, in real time, for any arbitrary rover position. Thus the GNSS rover's raw GNSS data fix can be corrected to a degree that makes it behave as if it were a surveyed reference location; hence the terminology "virtual reference station." An example of a network RTK system in accordance with embodiments of the present invention is described in U.S. Pat. No. 5,899,957, entitled "Carrier Phase Differential GPS Corrections Network," by Peter Loomis, assigned to the assignee of the present patent application and incorporated as reference herein in its entirety.

The Virtual Reference Station method extends the allowable distance from any reference station to the rovers. Reference stations may now be located hundreds of miles apart, and corrections can be generated for any point within an area surrounded by reference stations.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A tower crane load location determiner comprising:
    a load location measurer mounted proximal to a cab portion of the tower crane, the load location measurer to provide load location measurement information for a load coupled with a tower crane;
    a load position determiner utilizing the load location measurement information to determine a location of the load; and
    a user accessible load location provider for providing the determined location of the load.

2. The tower crane load location determiner of claim 1 further comprising:
    a jib direction determiner to determine the direction the jib is facing, wherein the load position determiner utilizes the information provided by the jib direction determiner in conjunction with the load location measurement information to determine the location of the load.

3. The tower crane load location determiner of claim 1 further comprising:
    a user interface module in a cab of the tower crane to present the location of the load results in a user accessible format.

4. The tower crane load location determiner of claim 1 wherein the load location measurer comprises:
    a long range radar; and
    a waveguide to provide a corner turning capability to the long range radar, the waveguide comprising:
    an approximately horizontal pointing dish;
    a waveguide; and
    an approximately vertical pointing dish.

5. The tower crane load location determiner of claim 4 wherein the load location measurer further comprises:
    the long range radar mounted proximal to a cab portion of the tower crane; and
    the waveguide is mounted proximal to a trolley portion of the tower crane.

6. The tower crane load location determiner of claim 1 wherein the load location measurer comprises:
    a laser distance measuring unit.

7. The tower crane load location determiner of claim 6 wherein the load location measurer further comprises:
    a number of reflective strips mounted proximal to other components of the tower crane.

8. The tower crane load location determiner of claim 1 further comprising:
    an accelerometer coupled with a hook block of the tower crane, the accelerometer to provide sway information with respect to the hook block, wherein the load position determiner utilizes the information provided by the accelerometer in conjunction with the load location measurement information to determine the location of the load.

9. The tower crane load location determiner of claim 1 further comprising:
    at least one navigation satellite system (NSS) position receiver coupled with the tower crane, the NSS position receiver to determine position information with respect to a jib of the tower crane, wherein the load position determiner utilizes the information provided by the NSS position receiver in conjunction with the load location measurement information to determine the location of the load.

10. A method for using radar to determine the location of a load of a tower crane, the method comprising:
    utilizing a long range radar mounted proximal to a cab portion of the tower crane, to perform load location measurements for a load coupled with a tower crane;
    utilizing the load location measurements to determine a location of the load; and
    providing the determined location of the load results on a user interface module in a cab of the tower crane in a user accessible format.

11. The method of claim 10 further comprising:
    determining the direction the jib is facing, wherein the load position determiner utilizes the jib direction in conjunction with the load location measurement information to determine the location of the load.

12. The method of claim 10 further comprising:
    comparing mechanical load location information with the location of the load determined by the long range radar; and
    providing a calibration result based on the comparing.

13. The method of claim 10 further comprising:
    providing a waveguide to allow corner turning capability for the long range radar, the waveguide comprising:
    an approximately horizontal pointing dish;
    a waveguide; and
    an approximately vertical pointing dish.

14. The method of claim 13 further comprising:
    coupling the waveguide proximal to a trolley portion of the tower crane.

15. The method of claim 10 further comprising:
    coupling an accelerometer with a hook block of the tower crane, the accelerometer providing sway information, wherein the sway information provided by the accelerometer is utilized in conjunction with the load location measurement information to determine the location of the load.

16. The method of claim 10 further comprising:
coupling at least one navigation satellite system (NSS) position receiver with the tower crane to determine NSS position information, wherein the NSS position information is utilized in conjunction with the load location measurement information to determine the location of the load.

17. A method for using a laser distance measuring unit to determine the location of a load of a tower crane, the method comprising:
utilizing a laser distance measuring unit mounted proximal to a cab portion of the tower crane, to perform load location measurements for a load coupled with a tower crane;
determining a location of the load based on the load location measurements; and
providing a result of the location of the load on a user interface module in a cab of the tower crane in a user accessible format.

18. The method of claim 17 further comprising:
determining the direction the jib is facing, wherein the load position determiner utilizes the jib direction in conjunction with the load location measurement information to determine the location of the load.

19. The method of claim 17 further comprising:
comparing mechanical load location information with the location of the load determined by the laser distance measuring unit; and
providing a calibration result based on the comparing.

20. The method of claim 17 further comprising:
coupling at least one reflective strip proximal to a trolley portion of the tower crane; and
coupling at least one reflective strip proximal to a hook-block portion of the tower crane.

21. The method of claim 17 further comprising:
coupling an accelerometer with a hook block of the tower crane, the accelerometer providing sway information, wherein the sway information provided by the accelerometer is utilized in conjunction with the load location measurement information to determine the location of the load.

22. The method of claim 17 further comprising:
coupling at least one navigation satellite system (NSS) position receiver with the tower crane to determine NSS position information, wherein the NSS position information is utilized in conjunction with the load location measurement information to determine the location of the load.

23. The method of claim 22 wherein the NSS position receiver is fixedly coupled with a counterweight of the tower crane.

24. The method of claim 22 wherein the NSS position receiver is fixedly coupled with approximately the front of a jib of the tower crane.

25. The method of claim 22 wherein the NSS position receiver further comprises:
a first antenna fixedly coupled with a counterweight of the tower crane; and
a second antenna fixedly coupled with approximately the front of a jib of the tower crane.

26. The method of claim 22 wherein the position information from the NSS position receiver is obtained from the position signal(s) group consisting of: global navigation satellite system (GNSS) signal(s), regional navigation satellite system signal(s), satellite based augmentation system (SBAS) signal(s), and ground based augmentation systems (GBAS) signal(s).

27. The method of claim 26 wherein the GNSS signal(s) are selected from the group consisting of: GPS signal(s), Glonass signal(s), Galileo signal(s), and Compass signal(s).

28. The method of claim 26 wherein the regional navigation satellite system signal(s) are selected from the group consisting of: Omnistar signal(s), StarFire signal(s), Centerpoint signal(s), Beidou signal(s), Doppler orbitography and radio-positioning integrated by satellite (DORIS) signal(s), Indian regional navigational satellite system (IRNSS) signal(s), and quasi-zenith satellite system (QZSS) signal(s).

29. The method of claim 26 wherein the SBAS signal(s) are selected from the group consisting of: wide area augmentation system (WAAS) signal(s), European geostationary navigation overlay service (EGNOS) signal(s), multi-functional satellite augmentation system (MSAS) signal(s), and GPS aided geo augmented navigation (GAGAN) signal(s).

30. The method of claim 26 wherein the GBAS signal(s) are selected from the group consisting of: local area augmentation system (LAAS) signal(s), ground-based regional augmentation system (GRAS) signals, Differential GPS (DGPS) signal(s), and continuously operating reference stations (CORS) signal(s).

\* \* \* \* \*